US012717946B2

(12) United States Patent
Grobbel et al.

(10) Patent No.: US 12,717,946 B2
(45) Date of Patent: Aug. 25, 2026

(54) METHODS AND SYSTEMS FOR SESSION-BASED AND SECURE ACCESS CONTROL TO A DATA STORAGE SYSTEM

(71) Applicant: Swissbit AG, Bronschhofen (DE)

(72) Inventors: Hubertus Grobbel, Munich (DE); Nicolas Schneider, Munich (DE)

(73) Assignee: SWISSBIT AG, Bronschhofen (CH)

( * ) Notice: Subject to any disclaimer, the term of this patent is extended or adjusted under 35 U.S.C. 154(b) by 392 days.

(21) Appl. No.: 18/059,892

(22) Filed: Nov. 29, 2022

(65) Prior Publication Data

US 2023/0274016 A1 Aug. 31, 2023

(30) Foreign Application Priority Data

Nov. 30, 2021 (DE) .................... 10 2021 131 424.0

(51) Int. Cl.
*G06F 21/62* (2013.01)
*G06F 12/14* (2006.01)

(52) U.S. Cl.
CPC ...... *G06F 21/6218* (2013.01); *G06F 12/1408* (2013.01); *G06F 2212/1052* (2013.01)

(58) Field of Classification Search
CPC ............ G06F 21/6218; G06F 12/1408; G06F 12/1466; G06F 12/1441; G06F 2212/7202; G06F 2212/1052; G06F 2212/214; G06F 2212/177
See application file for complete search history.

(56) References Cited

U.S. PATENT DOCUMENTS 5,740,465 A * 4/1998 Matsunami ........... G06F 13/126 710/24
9,274,974 B1 * 3/2016 Chen ..................... G06F 12/109
2009/0235344 A1 * 9/2009 Ohzaki ................... H04L 63/08 709/202
2010/0281273 A1 11/2010 Lee et al.
2011/0277013 A1 * 11/2011 Chinta .................... G06F 21/54 726/1
2014/0365653 A1 * 12/2014 Matoba .................. G06Q 10/10 709/225
2015/0286524 A1 * 10/2015 Trantham ............... G11C 29/52 714/766
2017/0083710 A1 * 3/2017 Chapman, III ......... G06F 3/067
2018/0322868 A1 * 11/2018 Retter ................... H04L 67/141
2019/0129864 A1 * 5/2019 Faraboschi ......... G06F 12/1027
2019/0196981 A1 * 6/2019 Silvert ................ G06F 21/6218

(Continued)

*Primary Examiner* — Bassam A Noaman
(74) *Attorney, Agent, or Firm* — Sheridan Ross P.C.

(57) ABSTRACT

A computer-implemented method is presented for session-based and secure access control to a data storage system, comprising: detecting an activation signal for initiating access to the data storage system; and at least one write session to write write session-related data to the data storage system. Each of the at least one write sessions comprises: in response to detecting the activation signal, selectively assigning a storage subarea to this write session; receiving or generating the data to be written in the context of the write session; protecting the data from later unauthorized access using an access protection assigned individually to the write session; and outputting the access-protected data in order to write it to the storage subarea of the data storage system that is selectively assigned to the write session, or to cause this to be done.

22 Claims, 5 Drawing Sheets

(56) References Cited

U.S. PATENT DOCUMENTS

2020/0358779 A1* 11/2020 Momchilov ........ G06F 9/45558
2023/0134534 A1* 5/2023 Lee ....................... G06F 3/0622
711/154

* cited by examiner (a)

(b)

METHODS AND SYSTEMS FOR SESSION-BASED AND SECURE ACCESS CONTROL TO A DATA STORAGE SYSTEM

CROSS-REFERENCE TO RELATED APPLICATIONS

This application claims the benefit of German Application No. 10 2021 131 424.0 filed Nov. 30, 2021, the entire contents of which are incorporated herein by reference in its entirety.

TECHNICAL FIELD

The present invention relates to a method and a data processing system for session-based and secure access control to a data storage system, and a storage medium with such a data processing system and a data storage system, and a recording system that is configured to interact with the data processing system to use the storage medium for storing recording data.

BACKGROUND

Recording systems of various types are regularly used to record recording data and to keep them stored until later processing. Such recording systems can in particular be photo or video cameras, audio recording devices such as dictation machines, data loggers for sensor data, in particular with regard to the so-called "Internet of Things" (IOT), or other monitoring systems, for example for monitoring machines or public places or buildings or safety-relevant areas.

Such a recording system typically comprises a storage interface for accessing a data storage system, which can be permanently integrated into the recording system or easily exchangeable, in particular in the form of a removable data medium such as a memory card or a memory stick. Normally, such recording systems are not themselves equipped to provide the data to be stored with access protection, such as encryption, because this requires additional computing power and expenses for access protection, in particular for a key exchange with regard to encryption, or a significantly more complex operation would have to be accepted.

While the need for data recording of all kinds is constantly increasing in many areas, such as in the area of security services, rescue services, protection systems for taxi drivers or bus drivers or in the area of industrial measurement and monitoring technology, for example with regard to continuous temperature monitoring of a cold chain, of energy consumption data for assigned invoicing and much more, such data recordings often have to meet high requirements for the associated data protection.

Data protection typically and often necessarily begins at the source of the data, followed by secure archiving, ensuring that further processing is exclusively related to specific events, and secure deletion of data that is not required.

The implementation of the requirements for legally compliant data processing therefore regularly requires a data protection concept, because recording data can often only be used if they have been recorded properly. Sufficient precautions must also be taken against the loss of data, which may affect the rights of persons in the recordings, and such a loss is often heavily sanctioned.

BRIEF SUMMARY

It is an object of the invention to specify methods and systems with which protected access to a data storage system, in particular for storing recording data, is technically further improved with regard to the data protection that can be achieved with it.

The solution to this problem is achieved according to the teaching of the independent claims. Various embodiments and refinements of the invention are the subject matter of the dependent claims.

A first aspect of the solution relates to a method, in particular a computer-implemented method, for session-based and secure access control to a data storage system. The method comprises: (i) detecting an activation signal to initiate access to the data storage system; and (ii) at least one write session to write related data to the data storage system. In the method, each of the at least one write sessions comprises: (iii) in response to detecting the activation signal, determining a free physical storage subarea of the data storage system to be used during the write session to write the data and selectively assigning this storage subarea to this write session; (iv) receiving or generating the data to be written in the context of the write session; (v) protecting the data using access protection, in particular assigned individually to the write session, which protects it from later access to the data storage system from other non-authorized access sessions; and (vi) outputting the access-protected data, in particular directly to the data storage system, in order to write it to the storage subarea of the data storage system that is selectively assigned to the write session, or to cause this to be done, the latter in particular as part of indirect access to the data storage system via one or more communication nodes connected in between.

The term "activation signal" as used herein means, in particular, a signal, such as a wired or wireless electrical, electromagnetic or optical signal, which is designed to be detectable or detected by the entity executing the method, such as a correspondingly configured data processing system, as an activation signal within the meaning of the method. Such an activation signal could be triggered in particular when switching on, when switching between different operating modes or when switching off a recording system or a data processing system itself executing the method and then detected as mentioned under (i).

The term "free physical storage subarea" as used herein is in particular a physical area of a storage system, such as one or more specific storage pages or storage blocks or the physical area of the storage system associated with a specific area of physical storage addresses, which is still "free" at the point in time under consideration. In this context, "free" is intended to mean that the free physical storage subarea is available for writing data, in particular because it has not yet been written to (at least since the storage was last reset) or because it is already released for overwriting existing data or available for other reasons.

The term "write session-related data" as used herein means, with respect to a particular write session, data that is specifically assigned to that write session to be output in its context for writing to the storage subarea of the data storage system assigned to the write session.

As possibly used herein, the terms "comprises", "contains", "includes", "has", "having", or any other variant thereof, as appropriate, are intended to cover non-exclusive inclusion. For example, a method or a device which comprises or has a list of elements is not necessarily limited to these elements, but can include other elements which are not expressly listed or are inherent to such a method or such a device.

Further, unless expressly stated to the contrary, "or" refers to an inclusive or and not to an exclusive "or". For example, a condition A or B is met by one of the following conditions: A is true (or present) and B is false (or absent), A is false (or absent) and B is true (or present), and both A and B are true (or present).

The terms “a” or “an” as used herein have the meaning of “one or more”. The terms “another” and “a further” and any other variant thereof are to be understood to mean “at least one other”.

The term “plurality” as used herein is to be understood to mean “two or more”.

The term “configured” or “set up” to perform a specific function (and respective modifications thereof) is to be understood within the meaning of the invention that the corresponding device is already provided in a configuration or setup in which it can execute the function or it is at least settable—i.e., configurable—so that it can execute the function after corresponding setup. The configuration can take place, for example, via a corresponding setting of parameters of a process sequence or of switches or the like for activating or deactivating functionalities or settings. In particular, the device can have multiple predetermined configurations or operating modes, so that configuring can be carried out by selecting one of these configurations or operating modes.

The method according to the first aspect thus enables secure data storage in the data storage system, in which access security has the effect in particular that data written in the context of earlier write sessions cannot be accessed or can be accessed only after prior successful authorization.

By analogy, this can be compared to a mailbox, in which mail, such as letters, can be posted at various times, but when posting items of mail one cannot gain access to items of mail already in the mailbox from previous postings unless one is authorized, i.e., in possession of the mailbox key. Since the various write sessions are separated from one another by the occurrence and detection of at least one activation signal, it is sufficient in terms of data protection to prove that such an activation signal occurred and was actually or at least in all probability also detected in order to prove that the previously stored data was protected thereafter and thus also during any later access session (e.g. for write access, read access or delete access).

The data written to the data storage system during an earlier write session can thus be access-protected in such a way that it can neither be viewed (in particular read), nor overwritten, nor deleted from later (not appropriately authorized) access sessions, nor can their existence be ascertained per se.

First, various exemplary embodiments of the method are described hereinafter, which in each case, unless expressly excluded or technically impossible, can be combined as desired with one another and with the further described other aspects of the solution.

In some embodiments, the received or generated write-session-related data is at least partially recording data that represents one or more real events or states of objects acquired continuously or repeatedly over a specific period of time by means of a recording system, in particular sensorily. The method is therefore particularly suitable for acquiring and storing recording data using a sequence of different write sessions, and protecting it in such a way that it can only be read in an authorized manner, in particular individually for each write session. For example, the recording data could come from a so-called dash cam of a police officer and only represent recordings of separate specific events within the scope of the police officer's operations. If, for example, to preserve evidence for a selected operation, the recording data were to be read as evidence, this can be done selectively for this operation by only authorizing the cancellation of the access protection for the recording data for the write session corresponding to this operation. It is also ensured that the recordings can also be used as evidence if an activation signal was detected thereafter, for example because the device was switched off or there is a later write session.

In some embodiments, the access protection comprises at least one of the following measures: (i) cryptographic encryption of the write session-related data; (ii) the or each further write session is only opened depending on a previous successful authentication of a write request requesting the write session.

According to some of these embodiments, the write-session-related data is encrypted in particular by means of an integrity-protecting and/or symmetric encryption, for example using AES GCM (AES Galois-Counter Mode) encryption. An authenticated encryption mode with associated data is thus available to enable both authentication and encryption of the data to be stored. Furthermore, the method is designed for a high data throughput, with the option of parallelizing data streams, and is therefore particularly advantageous with regard to real-time encryption of the data. The term “integrity-protecting encryption” as used herein is understood to mean an encryption that enables a recipient of a correspondingly encrypted message to recognize whether or that the message was changed on its transmission path and/or received incompletely.

In some embodiments, the encryption of the write session-related data takes place for each write session using a cryptographic key which is individually assigned to this respective write session. In this way, session-related access protection can be implemented or, if another protection concept already exists, additionally strengthened. The key(s) can set in particular in advance. For this purpose, they can be stored, for example, in a data processing device configured to carry out the method or in a storage assigned to it. However, it is also possible to first define the key or keys during the course of the method, for example on the basis of a random process or pseudo-random process or subject to a session counter.

In some embodiments, the method comprises multiple write sessions and the physical storage subarea of the data storage system to be assigned to the respective write session is determined in the context of a direct or indirect (in particular multi-level) address mapping from an address space with logical storage addresses to an address space with physical storage addresses of the physical storage area to be assigned to the respective write session. For at least two of the write sessions, the respective logical address spaces for the address mapping match at least with regard to their logical start address. On the input side, a uniform address space can be used for the at least two, in particular all, access sessions when address mapping (e.g. starting with the logical address “0” or any other fixed starting address), which, on the output side, corresponds to different physical address ranges depending on the session.

Indirect address mapping can be used in particular when the method is carried out by a system separate from the data storage system, in particular a data processing system (e.g. a separate semiconductor chip). This makes it possible, in particular, to use known standard memories, e.g., commercially available memory cards. Then the mapping of the logical to physical addresses can in a first stage be a mapping of logical addresses of one medium (data processing system) to logical addresses of the other medium (memory card etc.), and in a second stage a mapping of the logical addresses of the other medium (memory card etc.) to its physical storage addresses.

In some embodiments, the method further comprises receiving or generating an additional secret defined independently of the cryptographic key. For encrypting the data to be written, the additional secret is employed for each write session in addition to the respective cryptographic key provided for encryption, so that targeted decryption of the encrypted data is only possible if both a secret decryption key corresponding to the cryptographic key and the additional secret are known. In this way, a user can include the additional secret without knowing the key and thus influence the encryption. On the other hand, when the data is read, this key derivation information must be available again. In this way, the owner of the data can ensure who will be able to decrypt the data of the write session in question.

In some embodiments, a free physical storage subarea of the data storage system to be used during the respective write session to write the write-session-related data is determined and this storage subarea is selectively assigned to this write session subject to a session counter, which is changed each time the activation signal is detected, so that each counter reading of the session counter is selectively assigned exactly one write session and exactly one specific storage subarea corresponding thereto. In this way, a differentiation and assignment of different storage areas to different access sessions, in particular write sessions, can be achieved in a particularly efficient manner using a simple counter. It is particularly efficient if, according to some of these embodiments, the changes in the counter reading of the session counter always take place in the same counting direction, i.e. in terms of a strictly monotonic function.

In some embodiments, a file management structure which is individually adapted to and assigned to this storage subarea is defined at the beginning of each write session for the storage subarea assigned to the respective write session, which is used for the later writing of data in the context of the write session. The file management structure thus corresponds here to the storage subarea and ensures that for each access session, in particular write session, based on the file management structure that is defined for the storage subarea assigned to the access session, a valid file system for a file-related storage access is available. This is necessary to ensure the logical structure in each access session. In the example of FAT formatting, the master boot record, the partition boot record, the file allocation table and the root directory would be components of the file management structure. A typical size of this file management structure (management data) is a few megabytes, starting, for example, at the logical storage address "0".

According to some of these embodiments, the size of the assigned physical storage subarea available for writing in the context of the respective write session via the file management structure adapted thereto can be offered by the file management structure in particular as one of the two following options: (a) the entire physical residual storage size of the data storage system which has not yet been written to or has been released for overwriting; (b) a predefined storage size that can be configured, in particular, in advance (e.g. session-specifically) or, if this is no longer available in its entirety, a physical residual storage size of the data storage system that is actually still available and is unwritten or released for overwriting.

Particularly in the case of option b), the storage size can be configurable in the context of the physical residual storage size which is actually still available and has not been written to or released for overwriting, and can be predefined for this purpose subject to the respective write session. In this way, the storage sizes available for each session can be variably defined, especially application-specifically. In some embodiments, the method further comprises at least one read session for read accessing data previously written to the data storage system during at least one write session. In this case, the reading session comprises: (i) checking the permissibility of the respective pending read access by authenticating an object, in particular a user or device, to be granted read access; (ii) if the check reveals that the read access is permissible, determining at least one storage subarea assigned to the authenticated object from the set of storage subareas assigned to one or more of the previous write sessions in each case; (iii) reading access-protected data from the one or more storage subareas determined in this way; (iv) making the read data accessible by canceling the access protection in the context of the current reading session; and (v) outputting the data that has been made accessible. In this way, particularly with regard to a technical implementation of data protection requirements, it is possible to ensure that, during read access to the file storage system, only those write session-related data stored therein are accessible for which there is a corresponding authorization for reading.

According to some of these embodiments, the check is or will be defined in such a way that it shows that the read access is permissible if and to the extent that at least one of the following conditions applies in the context of the read access: (a) the data to be read in the context of the read access was written after an activation signal was last detected; (b) the data to be read in the context of the read access is classified as data which should be readable with every permissible read access. This classification can be or will be characterized in particular using a corresponding identification of the data itself, the file management structure or using a (logical or physical) address area of the storage area storing them. While option (a) enables easier access to newly written data, option (b) serves in particular to always present the file management structure in a readable manner in order to enable smooth functioning of the storage access management in the context of the respective reading session.

In some embodiments ("Variant 1"), the file management structure assigned to the storage subarea for the respective write session is written, in particular copied, to the storage subarea. This can be done in particular at the start of the write session, before data is written for the first time in the context of the writing session. In the further course of the writing or a later reading, a particularly simple address handling with little complexity can be implemented as a result.

In the course of write accesses in a write session, directories and files can be created, modified or deleted, which can result in a changed file management structure that should or even has to be retained for later reading of this specific session. Write accesses to the address space of the adapted file management structure can therefore be recorded in such a way that an overwriting of the default file management structure is recorded. In this way it can be determined whether and which write accesses were made to the storage area of the file management structure, in particular to carry out variant 2 below.

In some embodiments (hereinafter "Variant 2"), reading the access-protected data from a respective specific storage subarea comprises: (i) checking whether the respective read access relates to a storage address in the specific storage subarea, in which storage address data has already been written in the context of a previous write session relating to the storage subarea; (ii-1) if this is the case according to the result of the check for the respective read access, reading the access-protected data using a mapping of logical storage addresses to physical addresses of the storage subarea; and (ii-2) otherwise, reading the access-protected data using the file management structure individually assigned to the storage subarea.

In some of these embodiments ("Variant 3"), the method further includes: (iii) checking whether the respective read access relates to a logical storage address for the specific storage subarea which is accessible via the file management structure assigned to the storage subarea; (iv-1) if this is the case, reading the access-protected data according to the method according to variant 2; and (iv-2) otherwise, reading the access-protected data using a mapping of this logical storage address to a physical address of the storage subarea which is not accessible via the file management structure.

The case distinction between variants 2 and 3 enables the efficient reversal of the file management structure (overlay) when reading a previous session. In this way, a file management structure modified in a session (adding, modifying, and/or deleting files, which leads to an only slightly modified file management structure) can be read back at all despite the overlay logic.

A second aspect of the solution relates to a data processing system for session-based and secure access control to a data storage system, wherein the data processing system is configured to carry out the method according to the first aspect. In particular, the data processing system can be embodied separately from the data storage system, for example as a separate semiconductor component (e.g. integrated circuit, IC).

In some embodiments in this regard, the data processing system comprises: (i) an access protection means for protecting the write session-related data by means of the access protection; (ii) a detection means for detecting the activation signal; and (iii) an assignment means for determining a free physical storage subarea of the data storage system to be used during the respective write session to store the write session-related data and to selectively assig this storage subarea to the respective write session; and (iv) an interface for outputting the access-protected data in order to write it to the storage subarea of the data storage system that is selectively assigned to the respective current write session, or to cause this to be done.

A third aspect of the solution relates to a storage medium comprising a data processing system according to the second aspect and a data storage system with at least one data storage. The data processing system and the data storage system are integrated in the storage medium as a common structural unit. In addition, the data processing system is configured to carry out the method according to the first aspect for session-based and secure access control to the data storage system.

In some embodiments, the storage medium is designed as a mobile device, in particular a device that can be carried by hand, for example a memory card. Such a storage medium can also be referred to as an "intelligent storage medium" due to the data processing system integrated in it, which distinguishes it in particular from "normal" standard storage systems such as conventional memory cards for cameras.

A fourth aspect of the solution relates to a recording system for continuous or repeated sensory detecting real events or states of objects over a period of time and for providing recording data representing these detected events or states. The recording system is configured to cooperate with a data processing system according to the second aspect to use a storage medium according to the third aspect for storing the recording data. For this purpose, the recording system itself can in particular have this storage medium.

In some embodiments, the recording system is configured to enable a replacement of the storage medium by a user of the recording system in order to alternatively use multiple interchangeable mobile storage media (thus removable storage media) according to the third aspect, each temporarily for storing the recording data as a storage medium. This is particularly advantageous if the storage media is to be read outside or without using the recording system, for example at a central data protection, evaluation or monitoring point.

In some embodiments, the recording system has a data processing system according to the second aspect integrated therein, in particular permanently. In this way, the recording system can also be easily operated with conventional (not intelligent as mentioned above) data storage systems, such as conventional memory sticks or memory cards, using the method according to the first aspect.

A fifth aspect of the solution relates to a computer program or computer program product comprising instructions which, when executed on one or more processors of a data processing system according to the second aspect, of a storage medium according to the third aspect, or a recording system according to the fourth aspect with an integrated data processing system according to the second aspect, cause the method according to the first aspect to be carried out.

The computer program can in particular be stored on a non-volatile data carrier. Preferably, it is a data carrier in the form of an optical data carrier or a flash memory module. This can be advantageous if the computer program as such is to be handled independently of a processor platform on which the one or more programs are to be executed. In another implementation, the computer program can be present as a file on a data processing unit, in particular on a server, and can be downloaded via a data connection, for example the Internet or a dedicated data connection, such as a proprietary or local network. In addition, the computer program can have a plurality of interacting individual program modules. In particular, the modules can be configured or at least utilized in such a way that they are executed in the sense of distributed computing on different devices (computers or processor units), which are geographically spaced apart and connected to one another via a data network.

The data processing system can accordingly have a program storage in which the computer program is stored. Alternatively, the data processing system can also be set up to access a computer program available externally, for example on one or more servers or other data processing means, via a communication connection, in particular in order to exchange data with it that are used during the course of the method or computer program or represent outputs of the computer program.

The features and advantages explained with respect to the first aspect of the solution also apply correspondingly to the further aspects of the invention.

BRIEF DESCRIPTION OF THE SEVERAL VIEWS OF THE DRAWINGS

Further advantages, features, and possible applications of the present solution result from the following detailed description in conjunction with the figures.

In the figures.

DETAILED DESCRIPTION

In the figures, the same reference numbers denote the same, similar or corresponding elements. Elements depicted in the figures are not necessarily drawn to scale. Rather, the various elements shown in the figures are presented in such a way that their function and general purpose can be understood by those skilled in the art. Unless expressly stated otherwise, connections and couplings between functional units and elements illustrated in the figures can also be implemented as indirect connections or couplings. In particular, functional units can be implemented as hardware, software or a combination of hardware and software.

Figure 1A:
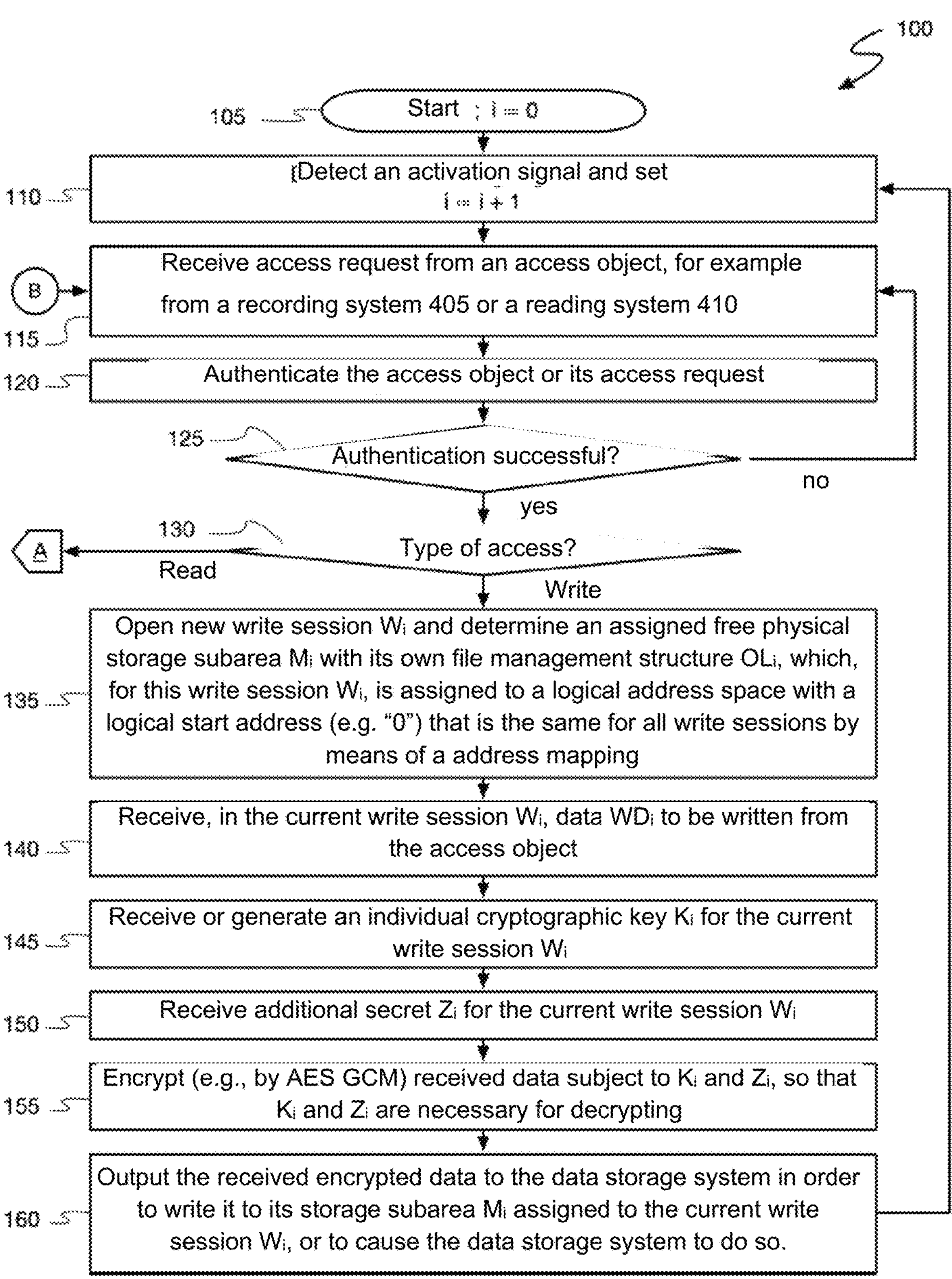
FIG. 1A/1B shows a flowchart to illustrate an exemplary embodiment of the method according to the solution.
Figure 1B:
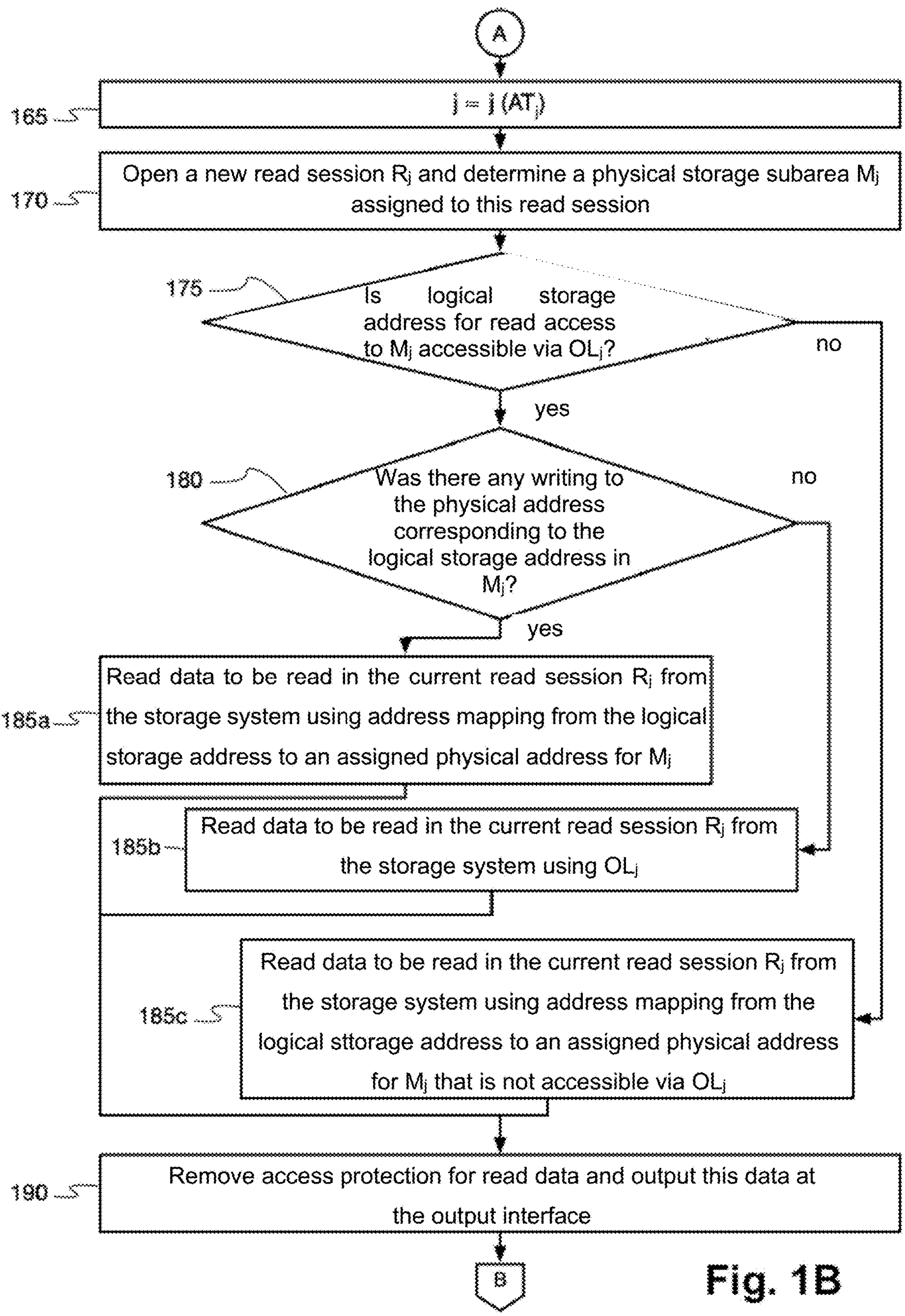

In the two FIGS. 1A and 1B, which are connected to one another by means of the connectors "A" and "B", an exemplary embodiment 100 of a method according to the solution is illustrated overall. In this context, FIG. 1A relates in particular to writing data in the context of one or more write sessions, while FIG. 1B relates to reading data in the context of one or more read sessions. The method 100 is explained below with additional reference to the further FIGS. 2 to 4.

Figure 2:
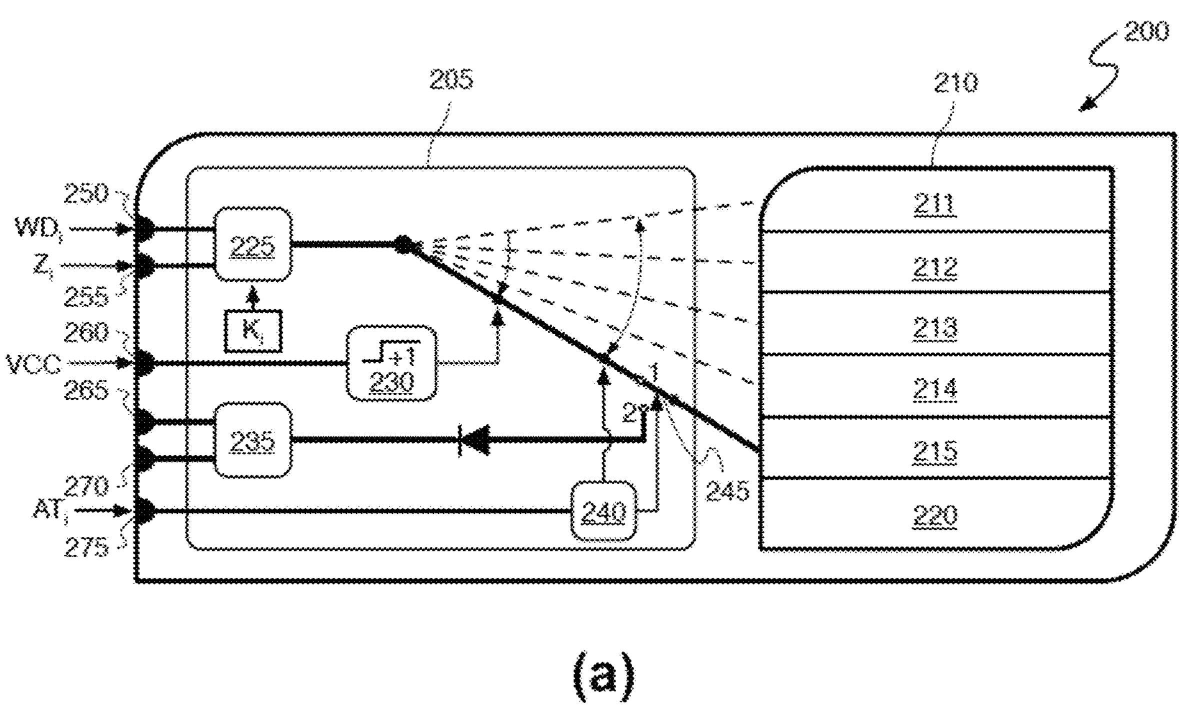
FIG. 2 shows schematically an exemplary embodiment of a storage medium according to the solution with an integrated data processing device, which is configured to carry out the method according to FIG. 1A/1B.
Figure 2:
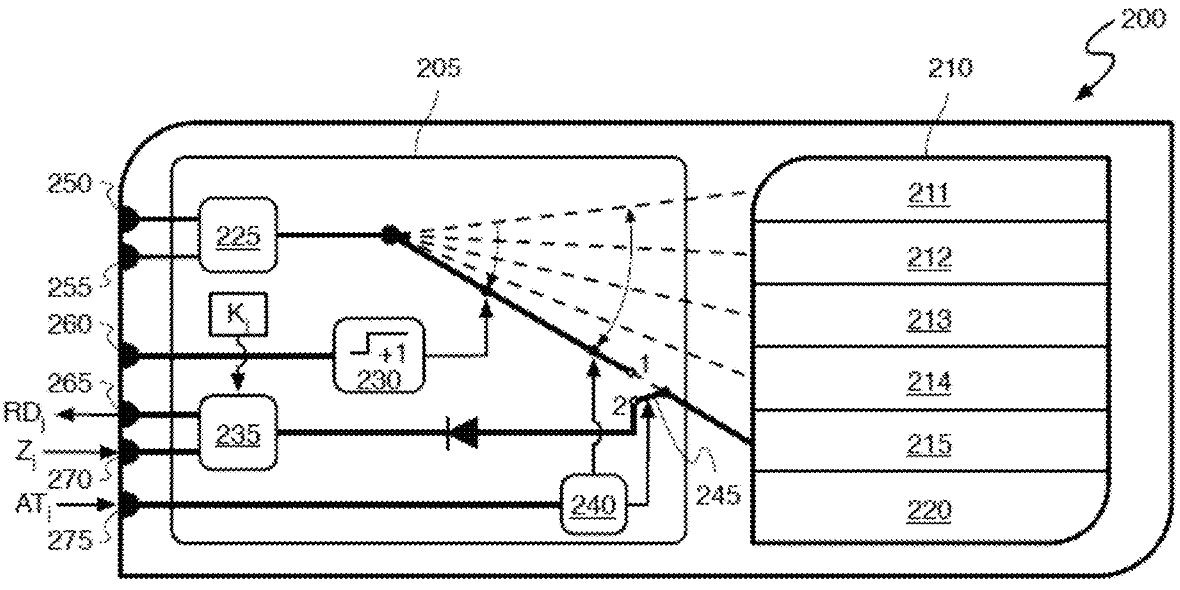

FIG. 2, which illustrates an exemplary storage medium 200 according to the solution, for example a memory card or a so-called memory stick, will first be discussed briefly in advance. Subfigure 2(*a*) is used to illustrate a write access, while subfigure 2(*b*) is used to illustrate a read access, in particular in the context of method 100. Storage medium 200 has in particular a data processing system 205 and a data storage system 210, for example a flash storage system. A storage controller (e.g., flash controller in the case of a flash storage) for the data storage system 210 can in particular be integrated either in the system itself or in the data processing system 205. The data processing system 205 and/or the data storage system 210 can in particular each be integrated circuits or cumulatively composed of a plurality of, in particular integrated, circuits. It is also conceivable for data processing system 205 and data storage system 210 to be included together in a single integrated circuit. Storage medium 200 has a number of interfaces or connections 250 to 275 for data input or data output or a supply voltage and possibly other signals. Storage medium 200, in particular data processing system 205, is configured to execute method 100 by means of appropriate computer programming. The computer program can be stored in particular in data processing system 205 itself or in data storage system 210.

Referring now again to FIG. 1A, the method 100 begins at a start step 105 in which an index i or a counter 230 of the data processing system 205 implementing said index i is initialized, index i serving as an index with respect to various write sessions. In a further step 110, which can also coincide with step 105, a possibly present activation signal is detected, which in FIG. 2(*a*) corresponds to a voltage supply signal VCC, which can be applied to interface 260. Each time the storage medium is again supplied with the voltage supply signal VCC and is thus activated, which can occur in particular if storage medium 200 is connected to a host device that also supplies it electrically, such as a recording system 405 (cf., FIG. 4), or is separated from it, index i is also incremented. This is done by incrementing a counter 230 in FIG. 2(*a*).

If, in a step 115, an access request is received from an access object, for example from a recording system 405 (see FIG. 4) or a reading system, such as a data archiving system 410, an authentication process 120 takes place in order to authenticate the access object or its access request. This can take place in particular by means of (i) receiving (from the access object) at an interface 275, and (ii) checking 125 authentication information $AT_i$, for example a password (e.g. a PIN) by means of an authentication unit 240. If it is determined in checking step 125 that the authentication was not successful (125—no), the system returns to step 115. In a possible modification, the authentication according to steps 120 and 125 can also be omitted.

Otherwise (125—yes), it is next checked whether writing or reading data to or from data storage system 210 is requested as the type of access according to the access request. In the case of a read request (130—"Read"), branching occurs to the procedural branch illustrated in FIG. 1B, which will be explained separately below. In the case of a write request (130—"Write"), a new write session W is opened in a further step 135, to which the current value of index i is assigned. In addition, the write session W is assigned a physical storage subarea $M_i$ that is still free, i.e. released for writing, in file storage system 210. In this case, the storage subarea $M_i$ can in particular either still be unwritten or else be released for overwriting by a storage manager, which can in particular be part of data processing system 205.

In particular, it is possible for the physical storage subarea $M_i$ to have its own file management structure $OL_i$ (which can also be referred to as "overlay") and, for the current write session $W_i$, is assigned to a logical address space with a logical start address (e.g., the logical address "0") that is the same for all write sessions by means of address mapping, so that the storage subarea $M_i$ can be addressed by data processing device 205 via logical addresses. If, as proposed here, the same logical start address is used for all write sessions, this simplifies the address mapping, since it does not have to be individualized on a session-specific basis, at least with regard to the start address.

The file management structure (overlay) $OL_i$ is primarily used to ensure that the storage medium always has a valid file system, in order to provide a logical structure, in particular logical addressing, for each access session. For example, in the case of a known FAT formatting, the master boot record, partition boot record, file allocation table, and root directory could be in the overlay. A typical size of this management data is a few megabytes, e.g. starting at the logical storage address 0. Alternatively, however, several overlays per session or even doing without an overlay are also conceivable.

The write session is now prepared for actual writing and in a further step 140, write data $WD_i$, which are to be written in the current write session $W_i$, can be received from the access object. In addition, in a step 145, an individual cryptographic key K is generated (or received) for the current write session $W_i$. It is also conceivable that the key $K_i$ is already stored in storage medium 200 in advance, and does not have to be generated as part of a write session or received from outside. It is also conceivable that the key is the same for several or even all sessions.

In a further step 150, an additional secret $Z_i$ for the current write session $W_i$ can optionally be received at interface 255, which is coupled, for example, to a user interface of a device connected to the storage medium with a signal, such as recording system 405, via which the additional secret $Z_i$ can be entered by a user.

In a step 155, received write data $WD_i$ can be cryptographically encrypted by an encryption unit 225 subject to key $K_i$ and possibly additional secret $Z_i$, which can be done using symmetric encryption, in particular according to the AES GCM standard.

Additional secret $Z_i$ can be used in particular to further increase the security of the data storage in the storage medium 200, since successful later reading requires knowledge of the additional secret $Z_i$ in addition to knowing the key $K_i$. For example, a user can ensure that only he/she or someone else who is in possession of the additional secret $Z_i$ can reconstruct the stored data, even if the key $K_i$ were accessible to other people.

The write data encrypted in this way can now be transmitted directly or indirectly to data storage system 210 in a step 160 in order to write it to the storage subarea $M_i$ assigned to the current write session $W_i$ or to cause data storage system 210 to carry out the writing process. To enable transmission to data storage system 210, a switch 245 in the transmission path is closed (position "1"). The session-related write data $WD_i$ are thus securely stored in storage medium 200, more precisely in its data storage system 210. The current write session $W_i$ has now ended and the method returns to step 110.

If an activation signal VCC is detected again, for example if the storage medium is again coupled to recording system 405 or another data source, a new process run is started, in which, possibly after successful authentication in step 125 and recognition of the "write" access type, a new write session is opened with an incremented index i. As illustrated by way of example in FIG. 2(*a*), incrementing index i or counter 230 causes the storage addressing in the context of an address mapping between logical and physical storage addresses to be adapted in such a way that a different physical storage subarea $M_i$ is used for the present write session than in the previous writing session. In FIG. 2(*a*), five different such storage subareas 211 to 215 are shown here by way of example. The opening of new write sessions is possible as long as there is still sufficient writable residual storage space 220 in data storage system 410. In particular, the following different, alternative operating modes can be provided: (i) a first mode ("maximum size mode") in which the entire residual storage that has not yet been written to or that has been released for overwriting is presented as the available file system size for the current write session, and (ii) a second mode ("fixed size mode"), in which a fixed, but optionally configurable storage size is presented as the available size of the file system. Only when the available residual storage size falls below the fixed size mentioned above with increasing writing to the data storage system, the current residual amount of storage is presented as the available file system size.

Reference is now made to FIGS. 1B and 2(*b*), which illustrate a stage of the method of method 100 assigned to reading data from data storage system 210 and the storage medium in a read access r, respectively.

This stage of the method is initiated when it is determined in step 130, already described above, that for an existing access request of an access object, for example a data archiving system 410 (cf. FIG. 4), the access type "read" is present and the previous authentication of the access object in steps 120/125 was successful (125—yes).

First, in a step 165, a read index j is then set subject to the access object authenticated using its authentication information $AT_j$ fed in at interface 275 in order to display a new read session $R_j$ assigned to this access request, which is opened in step 170. In this case, a storage subarea $M_j$ in data storage system 210 identified by the current value of index j is uniquely assigned to new read session $R_j$.

In the context of the read session $R_j$, only data stored in this storage subarea $M_j$ can be accessed, while the other storage subareas are not accessible and are preferably not even presented as being present. Authentication unit 240 also sets switch 245 to position "2", which on the one hand prevents write data from being written to file storage system 210 and on the other hand opens a strictly unidirectional data path for reading (this is indicated by the diode symbol, which does not mean, however, that a physical diode must actually be present here).

Figure 3:
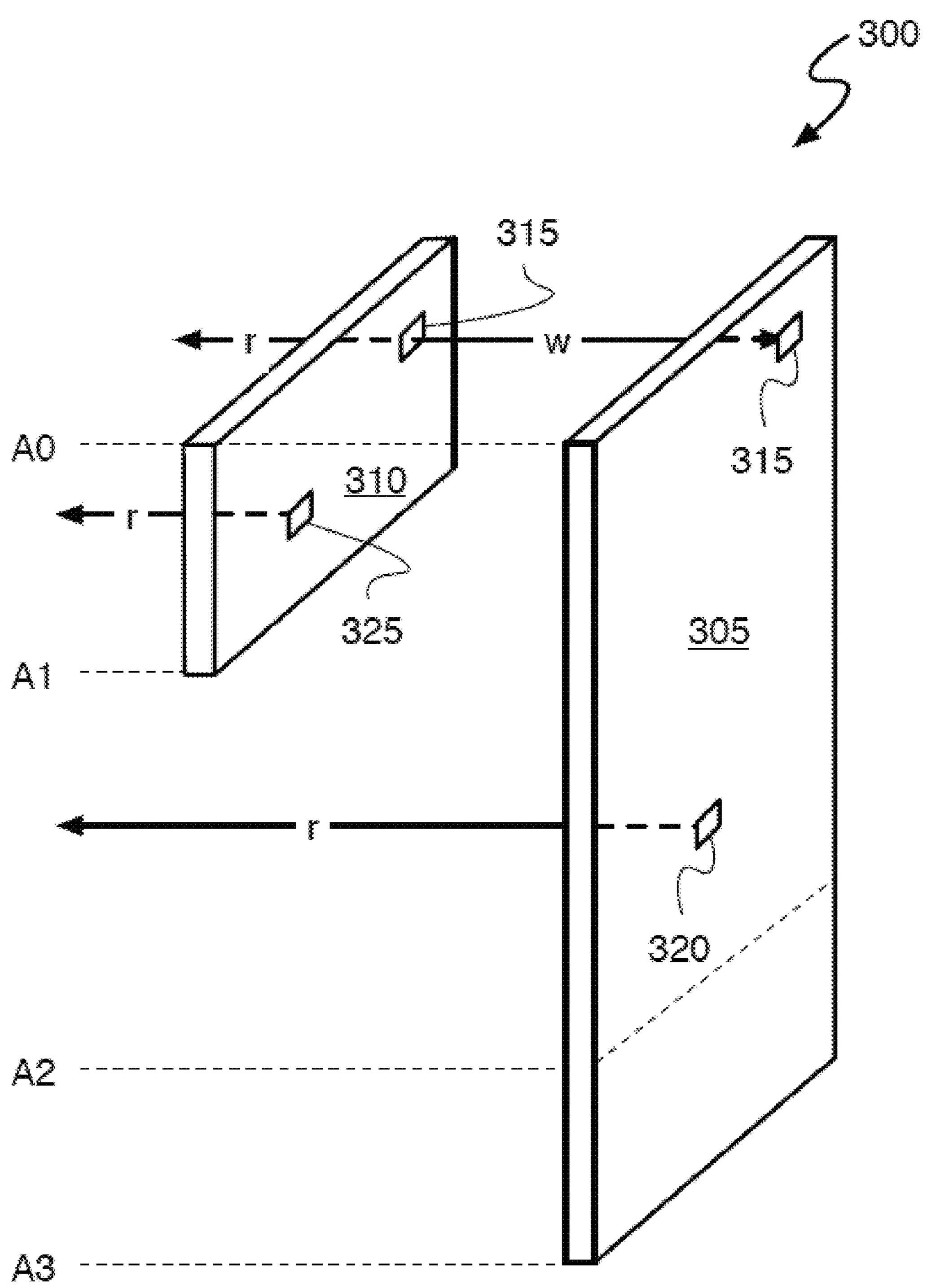
FIG. 3 is a schematic diagram illustrating use of a file management structure for write and read sessions, according to an exemplary embodiment according to the solution.

The following steps 175 to 185*c*, in conjunction with FIG. 3, illustrate an exemplary read access using a session-related file management system (overlay) $OL_j$. FIG. 3 illustrates on the one hand the logical address area (start address A0, end address A3) for a corresponding session-related physical storage subarea $M_j$, and on the other hand the logical address area of file management system $OL_j$ (start address A0, end address A1). Also, an exemplary logical end address A2 of the area occupied by data in the session-related logical address space [A0, . . . , A3] is drawn in FIG. 3.

In step 175 of method 100, it is now checked whether a respective logical storageaddress 315, 320 or 325 required for read access r to storage subarea $M_j$ is accessible via file management system $O_{Lj}$. If this is not the case (175—no; cf. logical storage address 320 in FIG. 3), branching to step 185*c* will follow, at which the data to be read in the current read session $R_j$ (read data) from data storage system 210 using address mapping from logical storage address 320 to an assigned physical address in storage subarea $M_j$ takes place. Otherwise (175—yes), a step 180 checks whether a physical storage address assigned to the logical storage address in $M_j$ has already been written to beforehand. If this is not the case (180—no, cf. logical storage address 325 in FIG. 3), branching to step 185*b* will follow, at which in the current read session $R_j$, instead of data from one of storage subareas $M_j$ or 211-215, only the contents of file management system $OL_j$ assigned to this address are read (written data in $M_j$ do not (yet) exist). Otherwise (180—yes; cf. logical storage address 315 in FIG. 3), branching to step 185*a* will follow instead, at which the data to be read in the current read session from data storage system 210 using address mapping from logical storage address 315 to an assigned physical address in $M_j$ takes place.

In a step 190, the access protection for the read data is now removed and this data is then output at output interface 265 as read data $RD_j$. In this case, removing the access protection corresponds to a decryption of the read data in an encryption unit 235 of data processing system 205. For decryption, decryption unit 235 must be provided with key $K_i$ and, again, additional secret $Z_j$, the latter via interface 270.

Storage medium 200 thus already contains all the necessary capabilities to carry out method 100, so that no special adaptations with regard to method 100 have to be provided on a host device which uses storage medium 200. Storage medium 200 can thus be used by the host device like a conventional standard storage medium, such as an SD memory card or a memory stick, while still offering the advantages of the solution proposed here, in particular of method 100. The integration of the data processing device according to the solution in a (thus) intelligent storage medium enables in particular data protection-compliant data storage without the host device itself, for example recording system 405, having to be modified.

Figure 4:
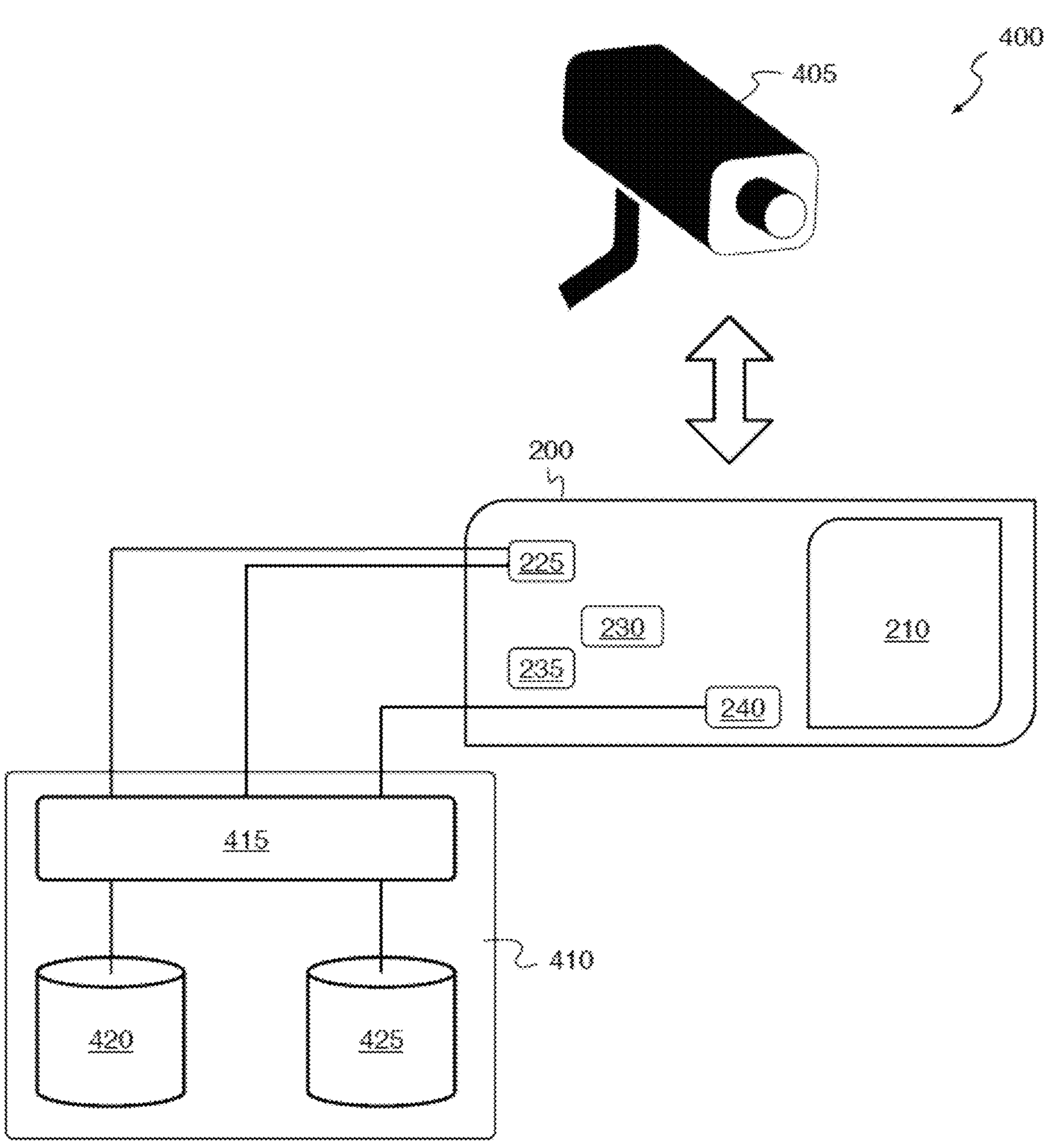
FIG. 4 schematically shows an overall system for recording data management, including recording system, storage medium and archiving system.

Referring now to FIG. 4, an overall system 400 for recording data management, including a recording system 405 (or any other host device set up for use with the storage medium), storage medium 200, and a data archiving system 410, and an exemplary application of the overall system will be explained.

Before storage medium 200 is used "in the field", it can be set up, for example, for a data protection officer, for example using a corresponding application program. In particular, at least one overlay can be defined, whether it is the same globally for all sessions (OL) or session-specific ($OL_j$). In particular, each overlay can define a required formatting and/or standard storage content, such as program installation files or application documentation. When setting up storage medium 200, it can also be determined whether the maximum size mode or the fixed size mode or instead a still differently defined third mode is to be used for the definition of the storage subarea to be presented in the context of a session. Then, the storage medium 200 is ready for use.

It can now be connected to recording system 405, in particular in the case of a pluggable storage medium 200 inserted into a corresponding receiving slot of recording system 405, and recording device 405 can be brought into a state in which it outputs activation signal VCC to storage medium 200. This can be done in particular when recording system 405 is switched on. Recording system 405 now recognizes the valid file management system (overlay) and can write data into file storage system 210 of storage medium 200 in the context of the writing process, in particular according to method 100. After the recording with the writing of the data, it is switched off on its system, so that activation signal VCC is removed.

The next time the device is switched on, activation signal VCC present again on storage medium 200 is detected again, as a result of which the recording device is again presented with an empty storage, so that the data previously written is no longer visible.

After the recording is complete, the user can start an archiving application 415 assigned to data archiving system 410, in particular for the purpose of archiving the data stored in storage medium 200. In the context of application 415, the user is requested to authenticate himself/herself to storage medium 200 then connected to data archiving system 410 by means of appropriate authentication data AT, as described above with reference to FIG. 1B. After successful authentication, the user can select one, several or all of the sessions from a list of recorded sessions, depending on the authentication, and transfer the data from these sessions, for example, to an archive 420 for archiving purposes. If a respective session-dependent additional secret $Z_i$ was used during storing, this additional secret must also be made available to storage medium 200 for reading the corresponding data, as described above with reference to FIG. 1B. Authentication data AT and possibly the additional secret(s) $Z_i$ can be kept in particular in an access-secured data storage 425 assigned to data archiving system 410.

After completion of the data export of all data to be exported, in particular all previous write sessions, to archive 420, the intelligent storage medium is reset, and all data is cryptographically deleted by discarding key K or session-related key $K_i$ and/or overwritten in a dedicated manner, and the session counter 230 is reset again. If a change of overlay(s) is required, this can now be done as well. The user can now reinsert storage medium 200 into recording device 405 and make new secure recordings.

While at least one exemplary embodiment has been described above, it should be appreciated that a large number of variations exists. It should also be noted that the exemplary embodiments described only represent non-limiting examples, and are not intended to limit the scope, the applicability, or the configuration of the devices and methods described herein. Rather, the foregoing description will provide those skilled in the art with guidance for implementing at least one exemplary embodiment, while it should be understood that various changes in the operation and arrangement of elements described in an exemplary embodiment may be made without departing from the subject matter specified in the appended claims and its legal equivalents.

LIST OF REFERENCE NUMERALS

100 Method for access control according to an exemplary embodiment
105-190 Steps or subprocesses of method 100
200 Storage medium with data processing system and data storage system
205 Data processing system
210 Data storage system
211-215 Storage subareas
220 Residual storage size that is still free
225 Encryption unit
230 Unidirectional session counter, at the same time detection means
235 Decryption unit
240 Authentication unit
245 Switch
250-275 Interfaces for data input or data output
300 Write and read access when using a file management system
305 Logical address area of a session-related storage subarea
310 Logical address range of a file management system
315 Logical address already described session-related manner, which is available both in address area 305 and in address area 310
320 Logical address already described session-related manner, outside of address area 310
325 Logical address in address range 310 that has not yet been described in a session-related manner
400 Overall system for recording data management, including recording system, storage medium and archiving system.
405 Recording system
410 Data archiving system
415 Archiving application
420 Data archive storage
425 Storage for authentication data
i,j Session-related indices
A0 Logical start address of the session-related storage subarea
A1 Logical end address of the session-related file management system
A2 Logical end address of the area occupied by data in the session-related storage subarea
A3 Logical end address of the session-related storage subarea $AT_i$, $AT_j$ Session-related authentication data
K Session-related key
$M_i$; $M_j$ Storage subarea(s)
$OL_i$ Session-related file management system (overlay)
$RD_i$ Session related read data
R Read access
VCC Activation signal, specifically voltage supply signal
$W_i$ Write session
$WD_i$ Session-related write data
w Write access
$Z_i$ Session-related additional secret

What is claimed is:

1. A method for session-based and secure access control to a data storage system, the method comprising:

detecting an activation signal to initiate access to the data storage system; and opening a plurality of write sessions to write write session-related data to the data storage system, wherein each of the plurality of write sessions comprises:

in response to detecting the activation signal, determining a free physical storage subarea of the data storage system to be used during the write session to write the data in the context of a direct or indirect address mapping from an address space with logical storage addresses to an address space with physical storage addresses of the physical storage area to be assigned to the respective write session and selectively assigning the free physical storage subarea to the write session, wherein for at least two of the write sessions, the respective logical address spaces for the address mapping match at least with regard to their logical start address;

receiving or generating the data to be written in the context of the write session;

protecting the data using an access protection which protects the data from later access from unauthorized other access sessions to the data storage system;

outputting the access-protected data in order to write the access-protected data to the storage subarea of the data storage system that is selectively assigned to the write session; and conducting at least one read session for read accessing data previously written to the data storage system during at least one write session, the read session comprising:

checking the permissibility of a respective pending read access by authenticating an object to be granted read access, when the check reveals that the respective pending read access is permissible, determining at least one storage subarea assigned to the authenticated object from a set of storage subareas assigned to one or more of the previous write sessions in each case, reading access-protected data from the determined at least one storage subarea, making the read data accessible by canceling the access protection in the context of a current respective pending reading session, and outputting the data that has been made accessible, and wherein at the beginning of each write session for the storage subarea assigned to the respective write session, a file management structure which is individually adapted and assigned to the storage subarea is defined and used for a later writing of data in the context of the write session, and wherein reading the access-protected data from a respective specific storage subarea comprises:

checking whether the respective read access relates to a storage address in the specific storage subarea, in which storage address data has already been written in the context of a previous write session relating to the storage subarea, when the respective read access relates to a storage address in the specific storage subarea for the respective read access, reading the access-protected data using a mapping of logical storage addresses to physical addresses of the storage subarea, and otherwise, reading the access-protected data using the file management structure individually assigned to the storage subarea.

2. The method according to claim 1, wherein the received or generated write session-related data is at least partially recording data which represents one or more real events or states of objects acquired continuously or repeatedly over a specific period of time by means of a recording system.

3. The method according to claim 1, wherein the access protection comprises at least one of the following measures:

a cryptographic encryption of the write session-related data;

the or each further write session is only opened subject to a preceding successful authentication of a write request requesting the write session.

4. The method according to claim 3, wherein the encryption of the write session-related data takes place by means of an integrity-protecting and/or symmetric encryption.

5. The method according to claim 3, wherein encrypting of the write session-related data for each write session takes place using a cryptographic key which is individually assigned to the write session.

6. The method according to claim 1, furthermore comprising: receiving or generating an additional secret defined independently of a cryptographic key; wherein, for encrypting the data to be written, the additional secret is employed for each write session in addition to the respective cryptographic key provided for encryption, so that targeted decryption of the encrypted data is only possible when both a secret decryption key corresponding to the cryptographic key and the additional secret are known.

7. The method according to claim 1, wherein determining a free physical storage subarea of the data storage system to be used during a respective write session to write the write session-related data and selectively assigning the free physical storage subarea to the write session take place subject to a session counter, wherein the counter changed each time the activation signal is detected so that each counter reading of the session counter is selectively assigned exactly one write session and exactly one specific storage subarea corresponding thereto.

8. The method according to claim 7, wherein the changes in the counter reading always take place in the same counting direction.

9. The method according to claim 1, wherein at the beginning of each write session for the storage subarea assigned to the respective write session, a file management structure which is individually adapted and assigned to the storage subarea is defined and used for a later writing of data in the context of the write session.

10. The method according to claim 9, wherein the size of the assigned physical storage subarea available for writing in the context of the respective write session (Wi) via the file management structure adapted thereto, is offered by the file management structure as one of the following two options:

a) an entire physical residual storage size of the data storage system which has not yet been written to or has been released for overwriting; and b) a predefined storage size or, when the assigned physical storage subarea is no longer available in entirety, a physical residual storage size of the data storage system that is actually still available and has not been written to or released for overwriting.

11. The method according to claim 10, wherein in the context of option b), the storage size is configurable in the context of the physical residual storage size that is actually still available and has not been written to or released for overwriting and is predefined subject to a respective write session.

12. The method according to claim 9, wherein the file management structure assigned to the storage subarea for the respective write session is written to the storage subarea.

13. The method according to claim 1, wherein the check shows that the read access is permissible when and to the extent that at least one of the following conditions applies in the context of the read access:

the data to be read in the context of the read access was written after an activation signal was last detected; and the data to be read in the context of the read access is classified as data readable with every permitted read access.

14. The method of claim 1 further comprising:

checking whether the respective read access relates to a logical storage address for the specific storage subarea accessible via the file management structure is assigned to the storage subarea;

when the respective read access relates to a logical storage address for the specific storage subarea accessible via the file management structure is assigned to the storage subarea, reading the access-protected data according to the method according to claim 1; and otherwise, reading the access-protected data using a mapping of the logical storage address to a physical address of the storage subarea not accessible via the file management structure.

15. A data processing system for session-based and secure access control to a data storage system, the data processing system comprising: a processor; and a memory coupled with and readable by the processor and storing therein a set of instructions which, when executed by the processor, causes the processor to:

detect an activation signal to initiate access to the data storage system; and opening a plurality of write sessions to write write session-related data to the data storage system, wherein each of the plurality of write sessions comprises:

in response to detecting the activation signal, determine a free physical storage subarea of the data storage system to be used during the write session to write the data in the context of a direct or indirect address mapping from an address space with logical storage addresses to an address space with physical storage addresses of the physical storage area to be assigned to the respective write session and selectively assigning the storage subarea to the write session, wherein for at least two of the write sessions, the respective logical address spaces for the address mapping match at least with regard to their logical start address;

receive or generate the data to be written in the context of the write session;

protect the data using an access protection which protects the data from later access from unauthorized other access sessions to the data storage system;

output the access-protected data in order to write the access-protected data to the storage subarea of the data storage system that is selectively assigned to the write session; and conduct at least one read session for read accessing data previously written to the data storage system during at least one write session, the read session comprising:

checking the permissibility of a respective pending read access by authenticating an object to be granted read access, when the check reveals that the respective pending read access is permissible, determining at least one storage subarea assigned to the authenticated object from a set of storage subareas assigned to one or more of the previous write sessions in each case, reading access-protected data from the determined at least one storage subarea, making the read data accessible by canceling the access protection in the context of a current respective pending reading session, and outputting the data that has been made accessible, and wherein at the beginning of each write session for the storage subarea assigned to the respective write session, a file management structure which is individually adapted and assigned to the storage subarea is defined and used for a later writing of data in the context of the write session, and wherein reading the access-protected data from a respective specific storage subarea comprises:

checking whether the respective read access relates to a storage address in the specific storage subarea, in which storage address data has already been written in the context of a previous write session relating to the storage subarea, when the respective read access relates to a storage address in the specific storage subarea for the respective read access, reading the access-protected data using a mapping of logical storage addresses to physical addresses of the storage subarea, and otherwise, reading the access-protected data using the file management structure individually assigned to the storage subarea.

16. The data processing system according to claim 15, wherein the instructions further cause the processor to:

protect the write session-related data;

detect the activation signal;

determine a free physical storage subarea of the data storage system to be used during the respective write session to store the write session-related data, and to selectively assign the free physical storage subarea to the respective write session; and output the access-protected data in order to write the access-protected data to the storage subarea of the data storage system that is selectively assigned to a respective current write session.

17. A storage system, comprising:

a data processing system; and a data storage system having at least one data storage;

wherein the data processing system and the data storage system are integrated in a storage medium as a common structural unit; and the data processing system comprises:

a processor; and a memory coupled with and readable by the processor and storing therein a set of instructions which, when executed by the processor, causes the processor to:

detect an activation signal to initiate access to the data storage system; and opening a plurality of write sessions to write write session-related data to the data storage system, wherein each of the plurality of write sessions comprises:

in response to detecting the activation signal, determine a free physical storage subarea of the data storage system to be used during the write session to write the data in the context of a direct or indirect address mapping from an address space with logical storage addresses to an address space with physical storage addresses of the physical storage area to be assigned to the respective write session and selectively assigning the free physical storage subarea to the write session, wherein for at least two of the write sessions, the respective logical address spaces for the address mapping match at least with regard to their logical start address;

receive or generate the data to be written in the context of the write session;

protect the data using an access protection which protects the data from later access from unauthorized other access sessions to the data storage system;

output the access-protected data in order to write the access-protected data to the storage subarea of the data storage system that is selectively assigned to the write session; and conduct at least one read session for read accessing data previously written to the data storage system during at least one write session, the read session comprising:

checking the permissibility of a respective pending read access by authenticating an object to be granted read access, when the check reveals that the respective pending read access is permissible, determining at least one storage subarea assigned to the authenticated object from a set of storage subareas assigned to one or more of the previous write sessions in each case, reading access-protected data from the determined at least one storage subarea, making the read data accessible by canceling the access protection in the context of a current respective pending reading session, and outputting the data that has been made accessible, and wherein at the beginning of each write session for the storage subarea assigned to the respective write session, a file management structure which is individually adapted and assigned to the storage subarea is defined and used for a later writing of data in the context of the write session, and wherein reading the access-protected data from a respective specific storage subarea comprises:

checking whether the respective read access relates to a storage address in the specific storage subarea, in which storage address data has already been written in the context of a previous write session relating to the storage subarea, when the respective read access relates to a storage address in the specific storage subarea for the respective read access, reading the access-protected data using a mapping of logical storage addresses to physical addresses of the storage subarea, and otherwise, reading the access-protected data using the file management structure individually assigned to the storage subarea.

18. The storage system according to claim 17, wherein the storage medium is designed as a mobile device.

19. A recording system for continuous or repeated sensory detecting of real events or states of objects over a period of time and for providing recording data representing these detected events or states;

wherein the recording system is a physical recording system configured to cooperate with a data processing system to use a storage medium for storing the recording data by:

detecting an activation signal to initiate access to the data storage system; and opening a plurality of write sessions to write write session-related data to the data storage system, wherein each of the plurality of write sessions comprises:

in response to detecting the activation signal, determining a free physical storage subarea of the data storage system to be used during the write session to write the data in the context of a direct or indirect address mapping from an address space with logical storage addresses to an address space with physical storage addresses of the physical storage area to be assigned to the respective write session and selectively assigning the free physical storage subarea to the write session, wherein for at least two of the write sessions, the respective logical address spaces for the address mapping match at least with regard to their logical start address;

receiving or generating the data to be written in the context of the write session;

protecting the data using an access protection which protects the data from later access from unauthorized other access sessions to the data storage system;

outputting the access-protected data in order to write the access-protected data to the storage subarea of the data storage system that is selectively assigned to the write session; and conducting at least one read session for read accessing data previously written to the data storage system during at least one write session, the read session comprising:

checking the permissibility of a respective pending read access by authenticating an object to be granted read access, when the check reveals that the respective pending read access is permissible, determining at least one storage subarea assigned to the authenticated object from a set of storage subareas assigned to one or more of the previous write sessions in each case, reading access-protected data from the determined at least one storage subarea, making the read data accessible by canceling the access protection in the context of a current respective pending reading session, and outputting the data that has been made accessible, and wherein at the beginning of each write session for the storage subarea assigned to the respective write session, a file management structure which is individually adapted and assigned to the storage subarea is defined and used for a later writing of data in the context of the write session, and wherein reading the access-protected data from a respective specific storage subarea comprises:

checking whether the respective read access relates to a storage address in the specific storage subarea, in which storage address data has already been written in the context of a previous write session relating to the storage subarea, when the respective read access relates to a storage address in the specific storage subarea for the respective read access, reading the access-protected data using a mapping of logical storage addresses to physical addresses of the storage subarea, and otherwise, reading the access-protected data using the file management structure individually assigned to the storage subarea.

20. The recording system according to claim 19, wherein the recording system is configured to enable a replacement of the storage medium by a user of the recording system in order to alternatively use multiple interchangeable mobile storage media, each mobile storage media comprising a mobile device temporarily storing the recording data as a storage medium.

21. The recording system according to claim 19, wherein the data processing system is integrated therein.

22. A non-transitory, computer-readable medium comprising instructions stored therein which, when executed on one or more cause the one or more processors to provide session-based and secure access control to a data storage system by:

detecting an activation signal to initiate access to the data storage system; and opening a plurality of write sessions to write write session-related data to the data storage system, wherein each of the plurality of write sessions comprises:

in response to detecting the activation signal, determining a free physical storage subarea of the data storage system to be used during the write session to write the data in the context of a direct or indirect address mapping from an address space with logical storage addresses to an address space with physical storage addresses of the physical storage area to be assigned to the respective write session and selectively assigning the free physical storage subarea to the write session, wherein for at least two of the write sessions, the respective logical address spaces for the address mapping match at least with regard to their logical start address;

receiving or generating the data to be written in the context of the write session;

protecting the data using an access protection which protects the data from later access from unauthorized other access sessions to the data storage system;

outputting the access-protected data in order to write the access-protected data to the storage subarea of the data storage system that is selectively assigned to the write session; and conducting at least one read session for read accessing data previously written to the data storage system during at least one write session, the read session comprising:

checking the permissibility of a respective pending read access by authenticating an object to be granted read access, when the check reveals that the respective pending read access is permissible, determining at least one storage subarea assigned to the authenticated object from a set of storage subareas assigned to one or more of the previous write sessions in each case, reading access-protected data from the determined at least one storage subarea, making the read data accessible by canceling the access protection in the context of a current respective pending reading session, and outputting the data that has been made accessible, and wherein at the beginning of each write session for the storage subarea assigned to the respective write session, a file management structure which is individually adapted and assigned to the storage subarea is defined and used for a later writing of data in the context of the write session, and wherein reading the access-protected data from a respective specific storage subarea comprises:

checking whether the respective read access relates to a storage address in the specific storage subarea, in which storage address data has already been written in the context of a previous write session relating to the storage subarea, when the respective read access relates to a storage address in the specific storage subarea for the respective read access, reading the access-protected data using a mapping of logical storage addresses to physical addresses of the storage subarea, and otherwise, reading the access-protected data using the file management structure individually assigned to the storage subarea.

* * * * *